(12) United States Patent
Boulakhov et al.

(10) Patent No.: US 10,537,945 B2
(45) Date of Patent: Jan. 21, 2020

(54) END MILLS HAVING DIFFERENTIAL TWISTED GASH PROFILES

(71) Applicant: Hanita Metal Works Ltd., Nahariya (IL)

(72) Inventors: Sergei Boulakhov, Nahariya (IL); Leonid Sharivker, Nahariya (IL)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/847,323

(22) Filed: Dec. 19, 2017

(65) Prior Publication Data
US 2018/0169773 A1    Jun. 21, 2018

(30) Foreign Application Priority Data
Dec. 20, 2016 (IL) .......................................... 249676

(51) Int. Cl.
*B23C 5/10* (2006.01)

(52) U.S. Cl.
CPC .......... *B23C 5/10* (2013.01); *B23C 2210/084* (2013.01); *B23C 2210/123* (2013.01)

(58) Field of Classification Search
CPC ........ B23C 2210/282; B23C 2210/285; B23C 2210/287; B23C 2210/0407; B23C 2210/04; B23C 5/10
See application file for complete search history.

(56) References Cited

U.S. PATENT DOCUMENTS

| | | | |
|---|---|---|---|
| D79,821 S | 11/1929 | Labge | |
| 4,963,059 A * | 10/1990 | Hiyama | B23C 5/003 407/11 |
| 5,049,009 A | 9/1991 | Beck | |
| 5,322,394 A * | 6/1994 | Okanishi | B23C 5/10 407/32 |
| 5,622,462 A | 4/1997 | Gakhar | |
| 6,899,494 B2 * | 5/2005 | Walrath | B23C 5/10 407/54 |
| 6,991,409 B2 * | 1/2006 | Noland | B23C 5/10 407/59 |
| 6,997,651 B2 * | 2/2006 | Kawai | B23C 5/10 407/53 |
| 8,807,882 B2 | 8/2014 | Volokh | |
| 9,211,593 B2 * | 12/2015 | Budda | B23C 5/10 |

(Continued)

FOREIGN PATENT DOCUMENTS

| | | |
|---|---|---|
| DE | 20310713 | 9/2003 |
| DE | 10225481 A1 | 12/2003 |

(Continued)

OTHER PUBLICATIONS

Oct. 12, 2018 Non-Final OA.
Aug. 12, 2018 Office Action (non-US).
Sep. 24, 2018 Office Action (non-US).

*Primary Examiner* — Willmon Fridie, Jr.
(74) *Attorney, Agent, or Firm* — Matthew S. Bedsole

(57) ABSTRACT

In one aspect, elongated rotary cutting tools such as end mills are described herein which may provide one or more advantages over prior designs. For example, in some embodiments, cutting tools described herein can provide reduced wear rates at corner cutting edges, may permit high ramp angles during processing up to and including 45° ramp angles, and/or increased tool life.

22 Claims, 12 Drawing Sheets

(56) References Cited

U.S. PATENT DOCUMENTS

| | | | |
|---|---|---|---|
| 9,211,594 B2 * | 12/2015 | Budda | B23C 5/10 |
| 9,364,904 B2 * | 6/2016 | Osawa | B23C 5/10 |
| D774,573 S * | 12/2016 | Sharivker | D15/139 |
| 9,555,486 B2 * | 1/2017 | Baba | B23C 5/10 |
| D792,489 S * | 7/2017 | Sharivker | D15/139 |
| D793,460 S * | 8/2017 | Sharivker | D15/139 |
| D798,921 S | 10/2017 | Frota De Souza | |
| D814,536 S | 4/2018 | Kawakami | |
| D815,672 S | 4/2018 | Shikama | |
| 10,160,046 B2 * | 12/2018 | Sakai | B23C 5/10 |
| 2004/0105729 A1 | 6/2004 | Giessler | |
| 2005/0084352 A1 | 4/2005 | Borschert | |
| 2007/0154272 A1 | 7/2007 | Wells | |
| 2007/0286691 A1 * | 12/2007 | Glimpel | B23C 5/10 407/54 |
| 2010/0054881 A1 | 3/2010 | Thomas | |
| 2010/0143052 A1 | 6/2010 | Aoki | |
| 2010/0272529 A1 | 10/2010 | Rozzi | |
| 2010/0322723 A1 | 12/2010 | Danielsson | |
| 2011/0150583 A1 | 6/2011 | Engström | |
| 2012/0003057 A1 | 1/2012 | Leyba | |
| 2012/0034043 A1 | 2/2012 | Krieg | |
| 2012/0087753 A1 | 4/2012 | Kataoka | |
| 2012/0201619 A1 | 8/2012 | Olsson | |
| 2013/0266389 A1 | 10/2013 | Hecht | |
| 2014/0003873 A1 | 1/2014 | Han | |
| 2014/0133926 A1 | 5/2014 | Budda | |
| 2014/0193220 A1 | 7/2014 | Tamura | |
| 2015/0210910 A1 | 7/2015 | Hejtmann | |
| 2016/0303664 A1 | 10/2016 | Azegami | |

FOREIGN PATENT DOCUMENTS

| | | |
|---|---|---|
| DE | 112011102667 T5 | 7/2013 |
| DE | 102014106886 A1 | 12/2014 |
| DE | 102016104158 A1 | 9/2016 |
| WO | WO2015068824 A1 | 5/2015 |
| WO | WO2016056266 A1 | 4/2016 |

* cited by examiner

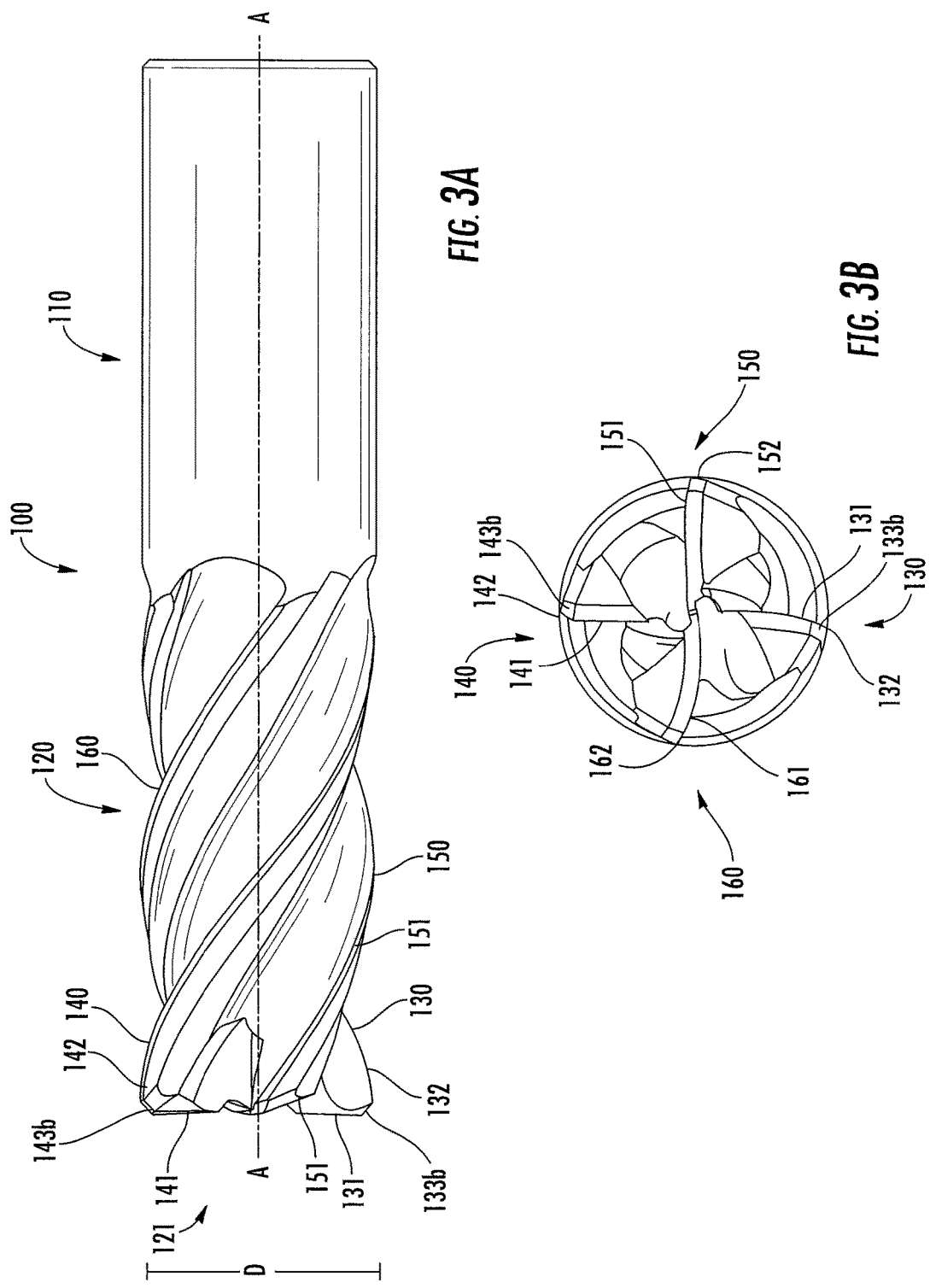

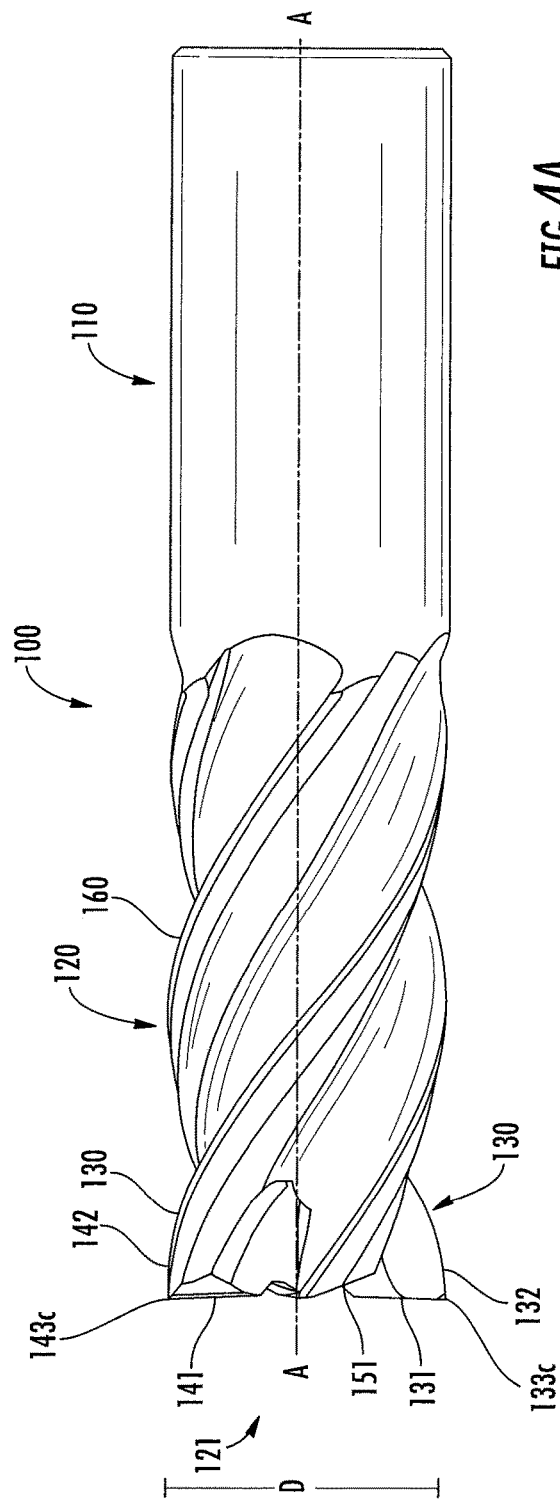
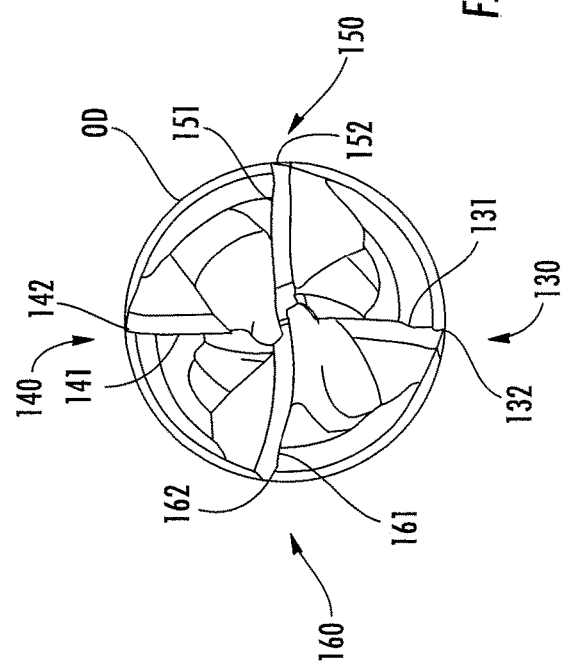
FIG. 4A
FIG. 4B

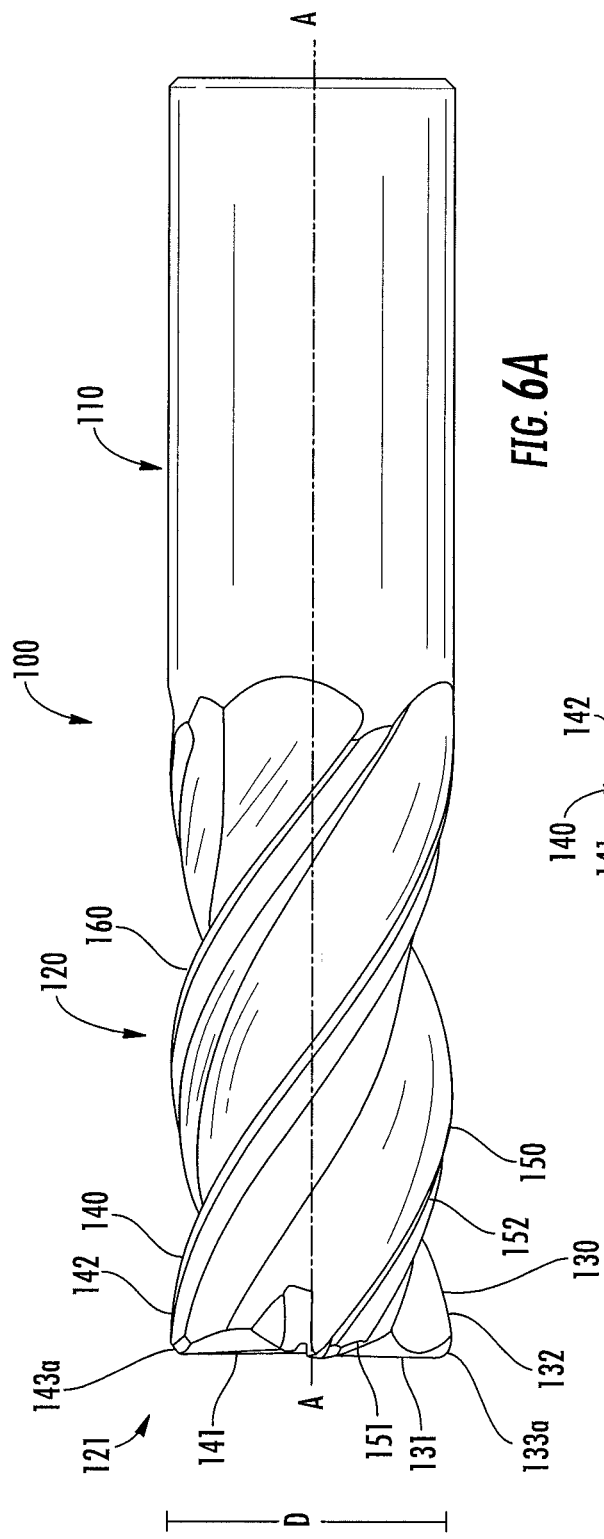
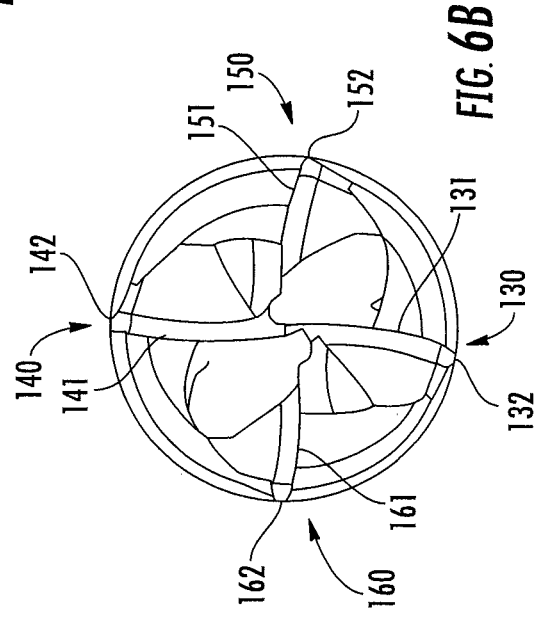

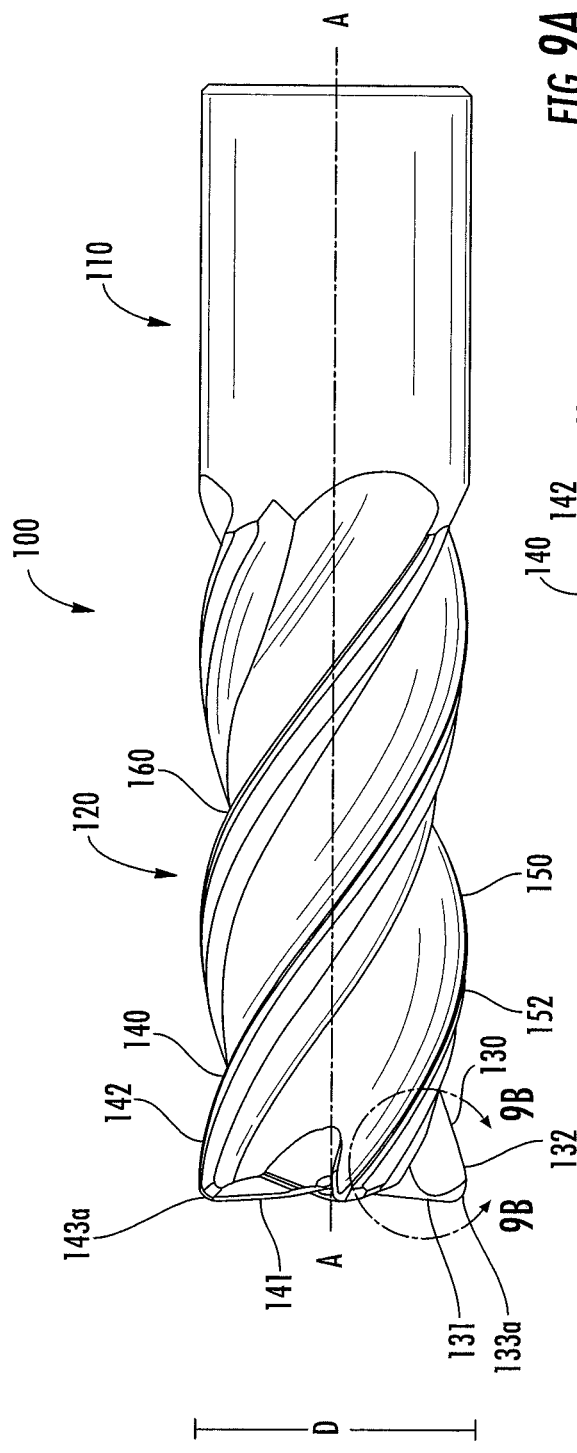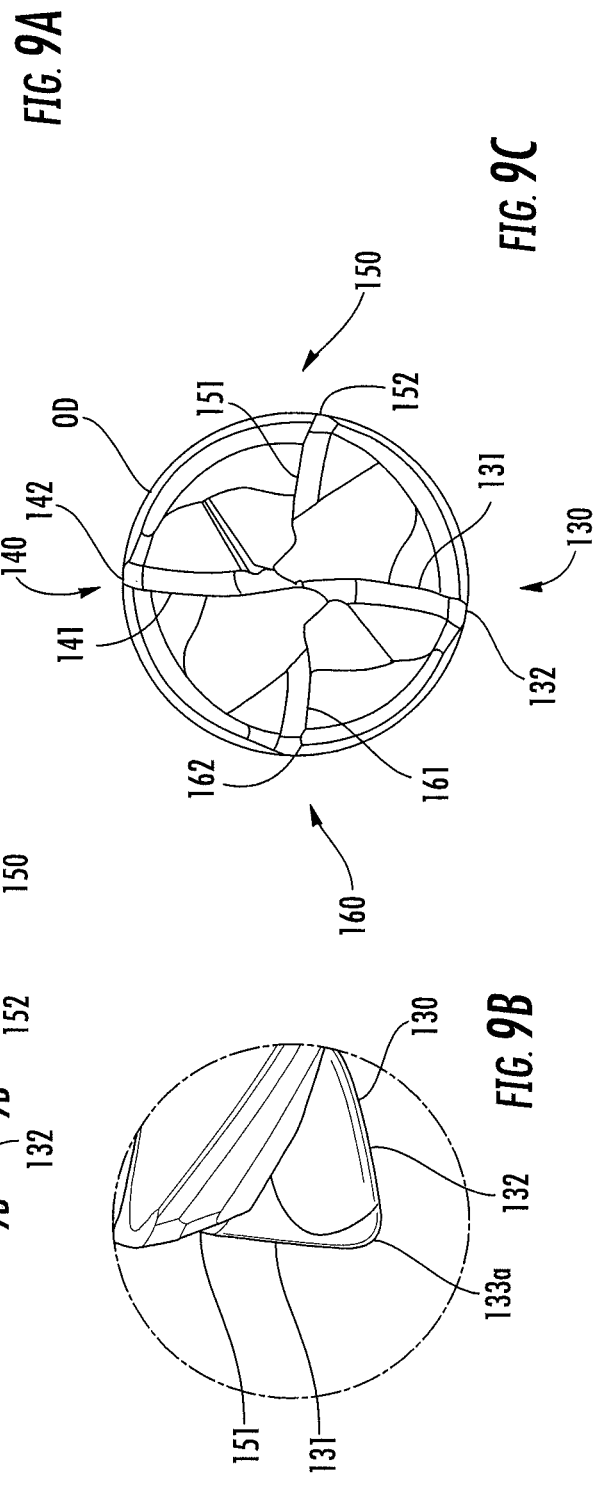
FIG. 9A
FIG. 9B
FIG. 9C

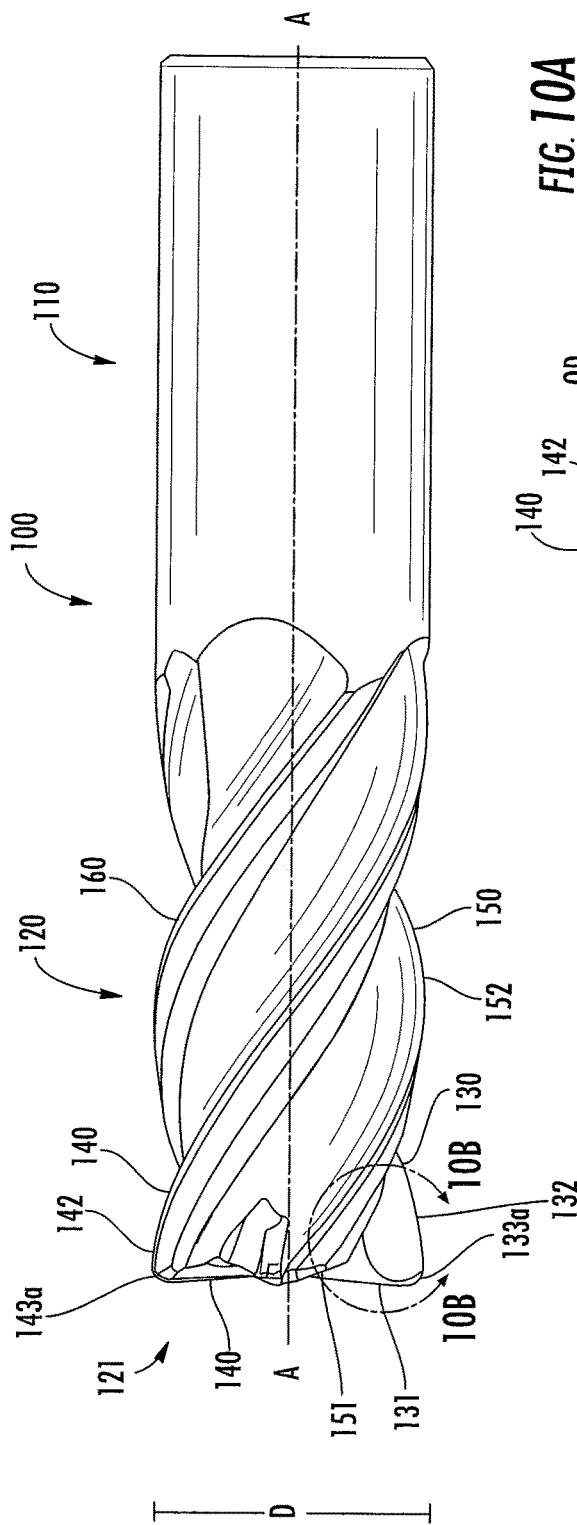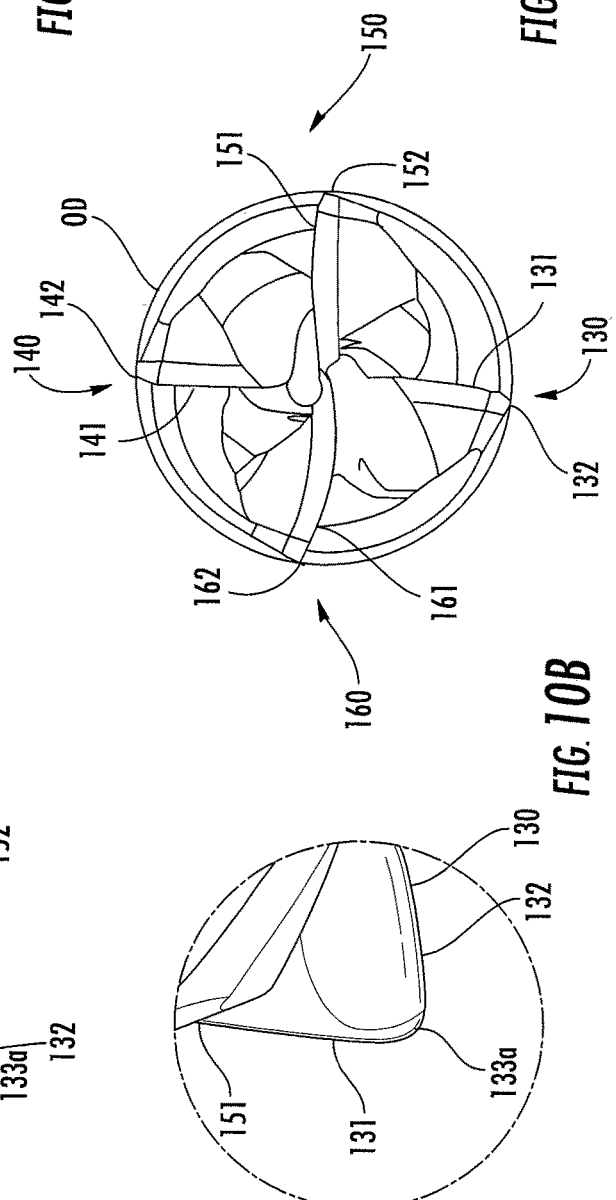

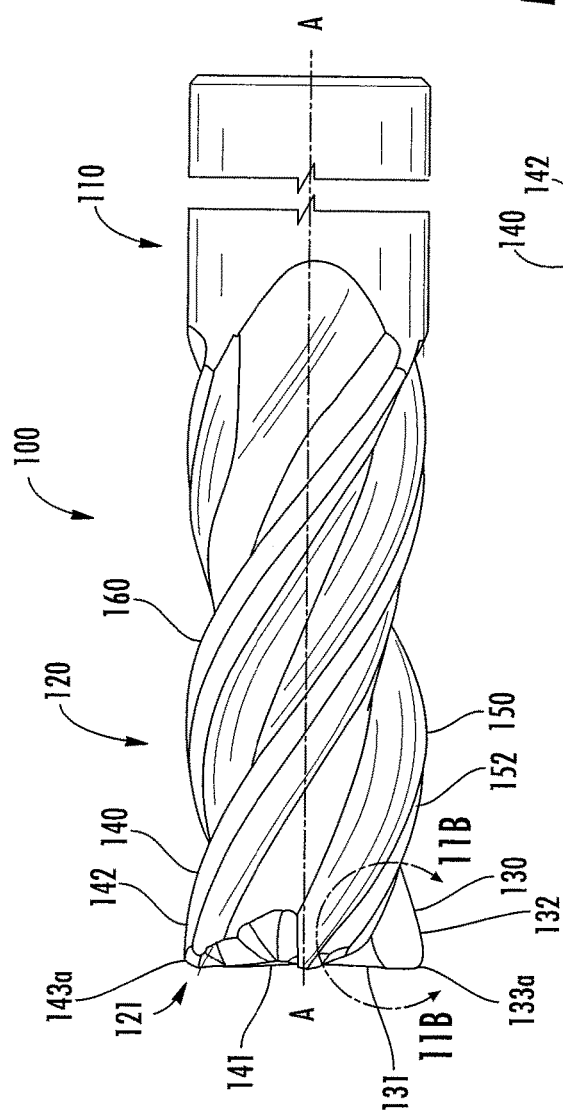
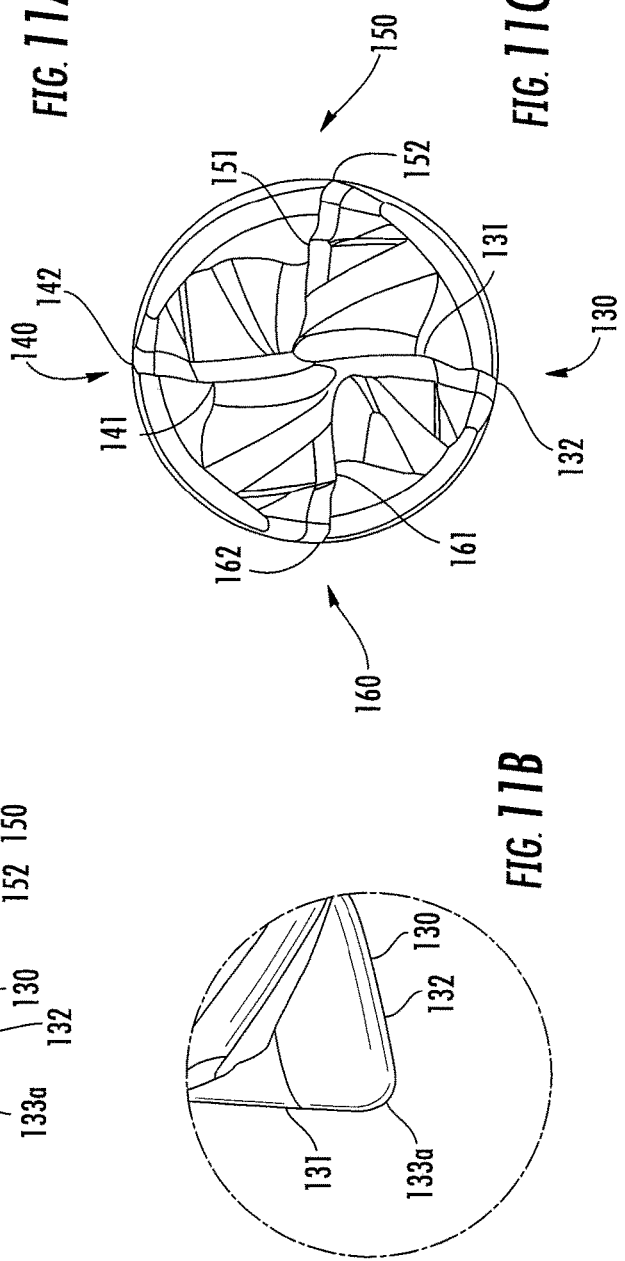
FIG. 11A
FIG. 11B
FIG. 11C

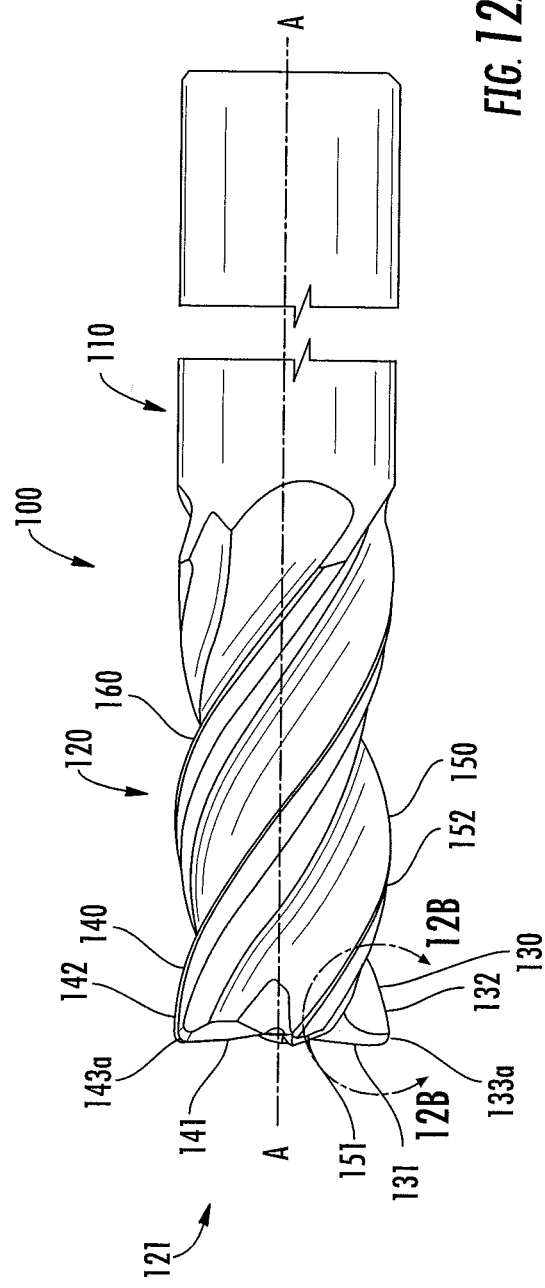
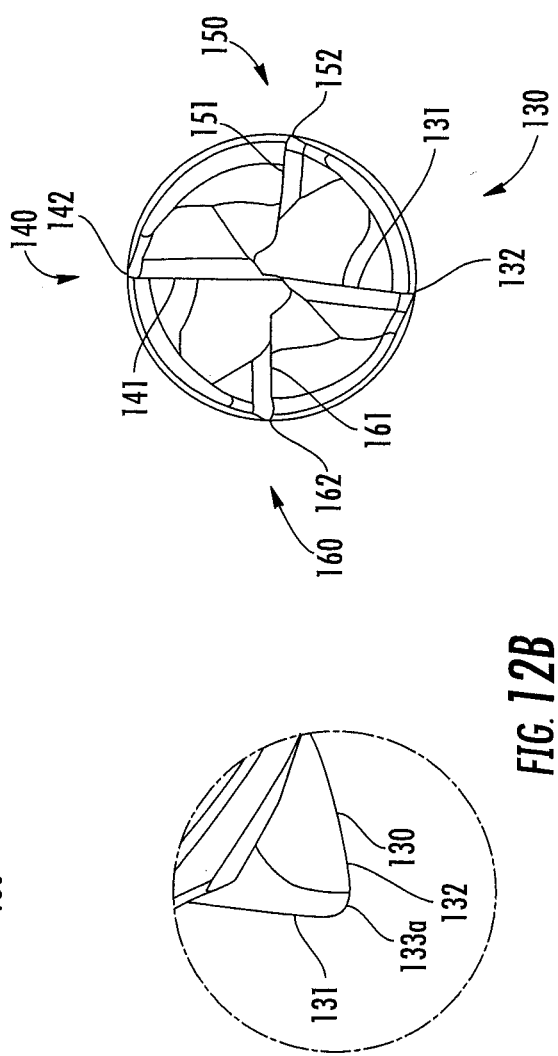
FIG. 12A
FIG. 12B
FIG. 12C

END MILLS HAVING DIFFERENTIAL TWISTED GASH PROFILES

RELATED APPLICATION DATA

The present application claims priority pursuant to 35 U.S.C. § 119(e) to Israeli Patent Application Number 249676 filed Dec. 20, 2016, which is incorporated herein by reference in its entirety.

FIELD OF THE INVENTION

The present invention relates to end mills and, in particular, end mills having curved dish profiles and/or differentially twisted gash profiles.

BACKGROUND

End milling tools having cutting edges disposed on both end surfaces and peripheral surfaces are frequently used in operations where it is desired that a tool remove material in both the axial and radial directions, as in the case of slotting operations. Such tools typically include a corner joining the end and peripheral edges ground into the tool. For many end mills, this corner is the area most susceptible to damage due to wear or chipping, particularly in ramping or peripheral cut operations. This may be due to the fact that each cutting edge makes one interrupted cut per revolution during peripheral milling operations. The repetitive impact on the corner cutting edge causes increased wear or corner damage relative to other types of machining operations. Corner wear or corner damage is a primary cause for reduction in end mill tool life reduction. In view of the foregoing, improved end mills are desired which provide one or more advantages over prior designs.

SUMMARY OF THE INVENTION

In one aspect, elongated rotary cutting tools such as end mills are described herein which may provide one or more advantages over prior designs. For example, in some embodiments, cutting tools described herein can provide reduced wear rates at corner cutting edges, may permit high ramp angles during processing up to and including 45° ramp angles, and/or increased tool life.

Elongated rotary cutting tools described herein define a central longitudinal axis and comprise a shank portion and a cutting portion adjoining the shank portion. The cutting portion has a cutting end and at least a first blade. The first blade has an end cutting edge and a peripheral cutting edge. The end cutting edge of the first blade extends from an outer diameter of the cutting portion towards the central longitudinal axis and defines a first dish profile and a first axial profile. The first dish profile is curved.

In addition, in some embodiments, rotary cutting tools described herein further comprise a second blade disposed opposite the first blade on the cutting portion, the second blade having an end cutting edge and a peripheral cutting edge. The end cutting edge of the second blade extends from the outer diameter of the cutting portion towards the central longitudinal axis. The end cutting edge of the second blade also defines a second dish profile and a second axial profile, wherein the second dish profile is curved.

These and other embodiments will be described further in the detailed description which follows and illustrated in the drawings which are described briefly below.

BRIEF DESCRIPTION OF THE DRAWINGS

FIG. 3A illustrates a side view of a rotary cutting tool according to one embodiment described herein.

FIG. 3B illustrates an end view of the rotary cutting tool of FIG. 3A.

FIG. 4A illustrates a side view of a rotary cutting tool according to one embodiment described herein.

FIG. 4B illustrates an end view of the rotary cutting tool of FIG. 4A.

FIG. 6A illustrates a side view of a rotary cutting tool according to one embodiment described herein.

FIG. 6B illustrates an end view of the rotary cutting tool of FIG. 6A.

FIG. 9A illustrates a side view of a rotary cutting tool according to one embodiment described herein.

FIG. 9B shows an enlarged view of a portion of the rotary cutting tool of FIG. 9A.

FIG. 9C illustrates an end view of the rotary cutting tool of FIG. 9A.

FIG. 10A illustrates a side view of a rotary cutting tool according to one embodiment described herein.

FIG. 10B shows an enlarged view of a portion of the rotary cutting tool of FIG. 10A.

FIG. 10C illustrates an end view of the rotary cutting tool of FIG. 10A.

FIG. 11A illustrates a side view of a rotary cutting tool according to one embodiment described herein.

FIG. 11B shows an enlarged view of a portion of the rotary cutting tool of FIG. 11A.

FIG. 11C illustrates an end view of the rotary cutting tool of FIG. 11A.

FIG. 12A illustrates a side view of a rotary cutting tool according to one embodiment described herein.

FIG. 12B shows an enlarged view of a portion of the rotary cutting tool of FIG. 12A.

FIG. 12C illustrates an end view of the rotary cutting tool of FIG. 12A.

DETAILED DESCRIPTION

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

Figure 1A:
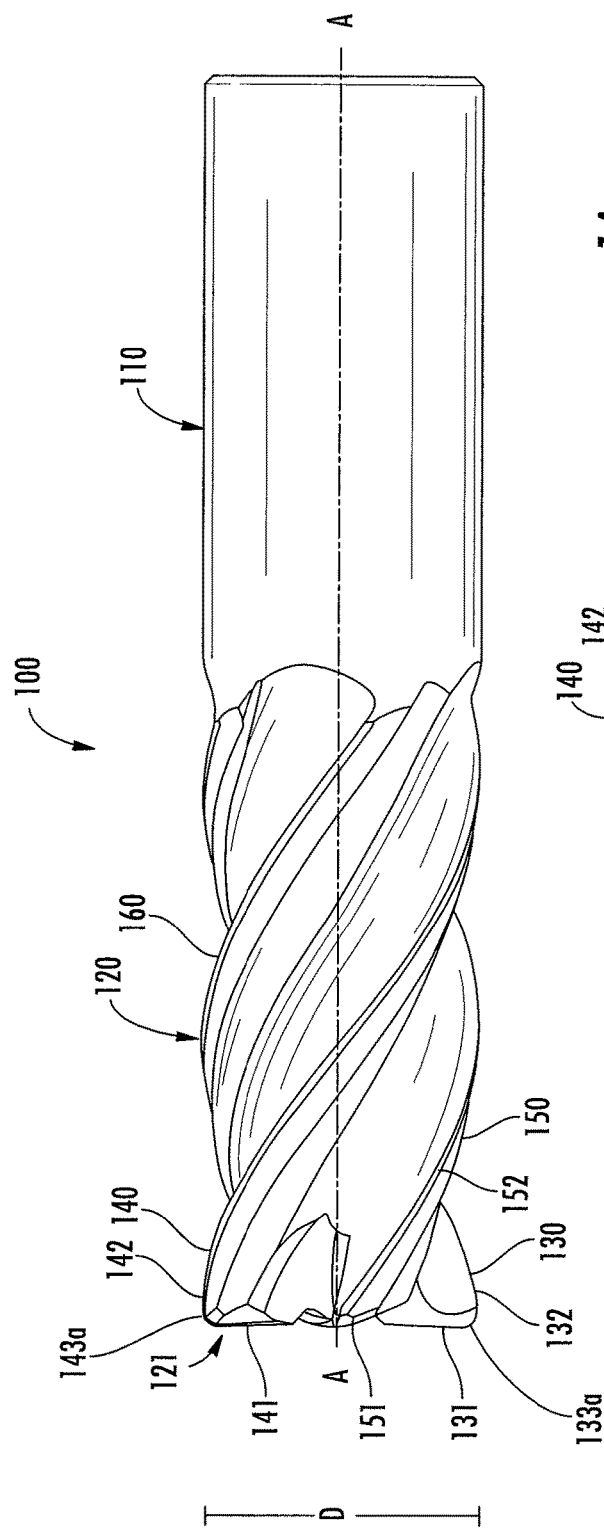
FIG. 1A illustrates a side view of a rotary cutting tool according to one embodiment described herein.
Figure 5A:
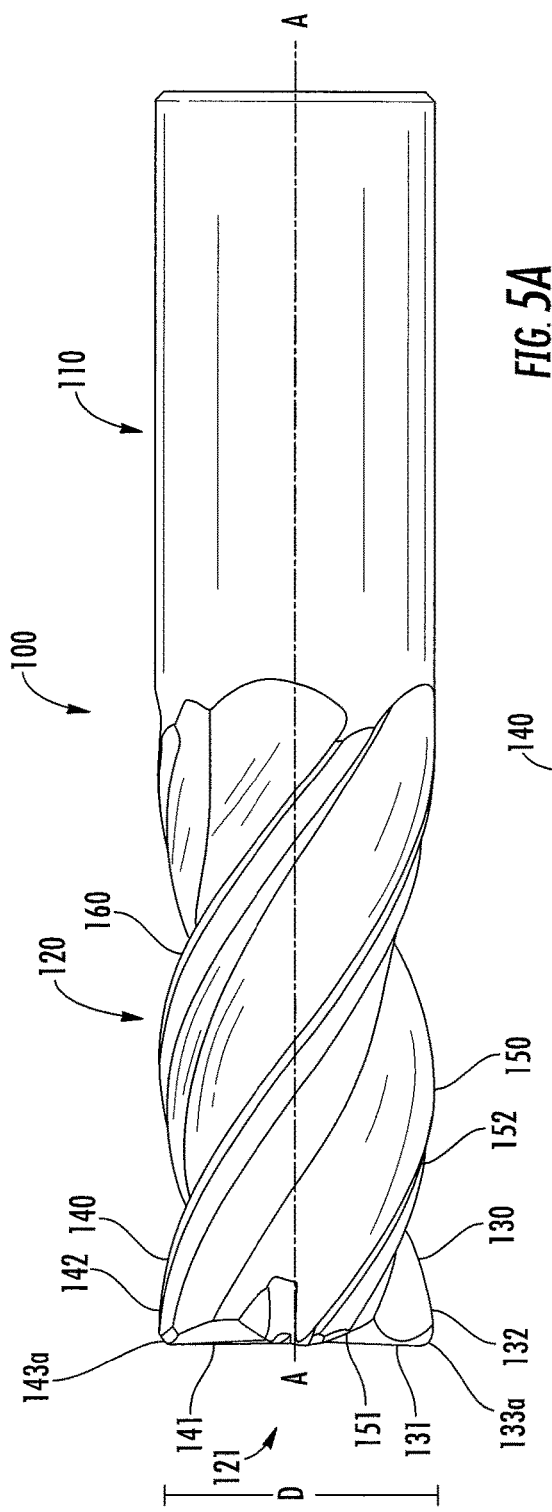
FIG. 5A illustrates a side view of a rotary cutting tool according to one embodiment described herein.
Figure 5B:
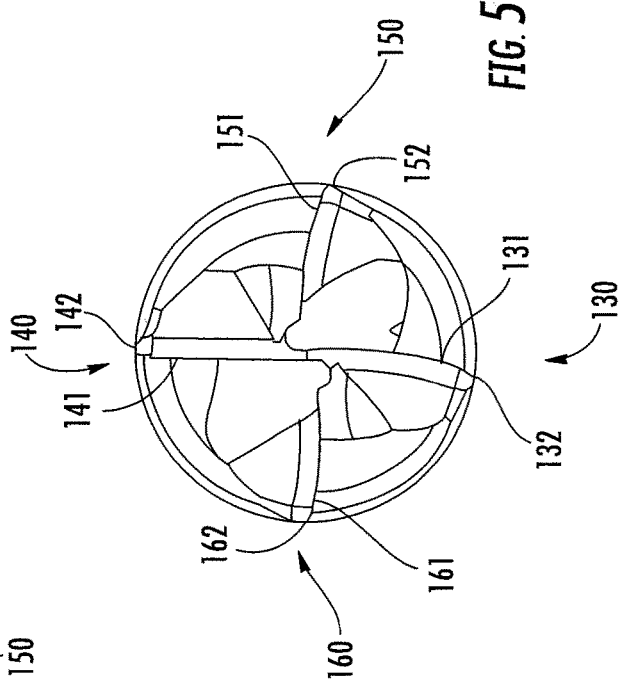
FIG. 5B illustrates an end view of the rotary cutting tool of FIG. 5A.
Figures 7A, 7B:
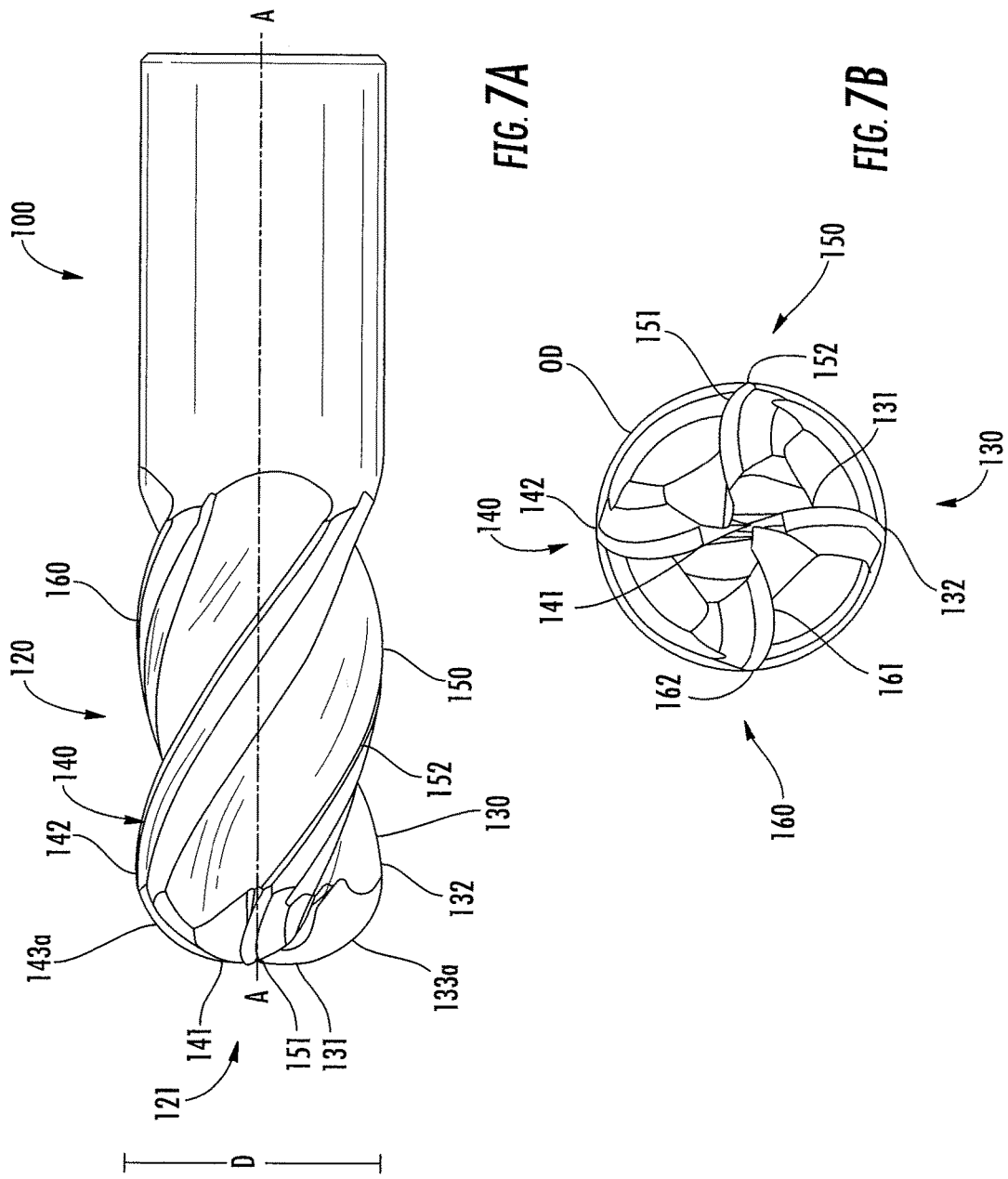
FIG. 7A illustrates a side view of a rotary cutting tool according to one embodiment described herein.
FIG. 7B illustrates an end view of the rotary cutting tool of FIG. 7A.
Figure 8A:
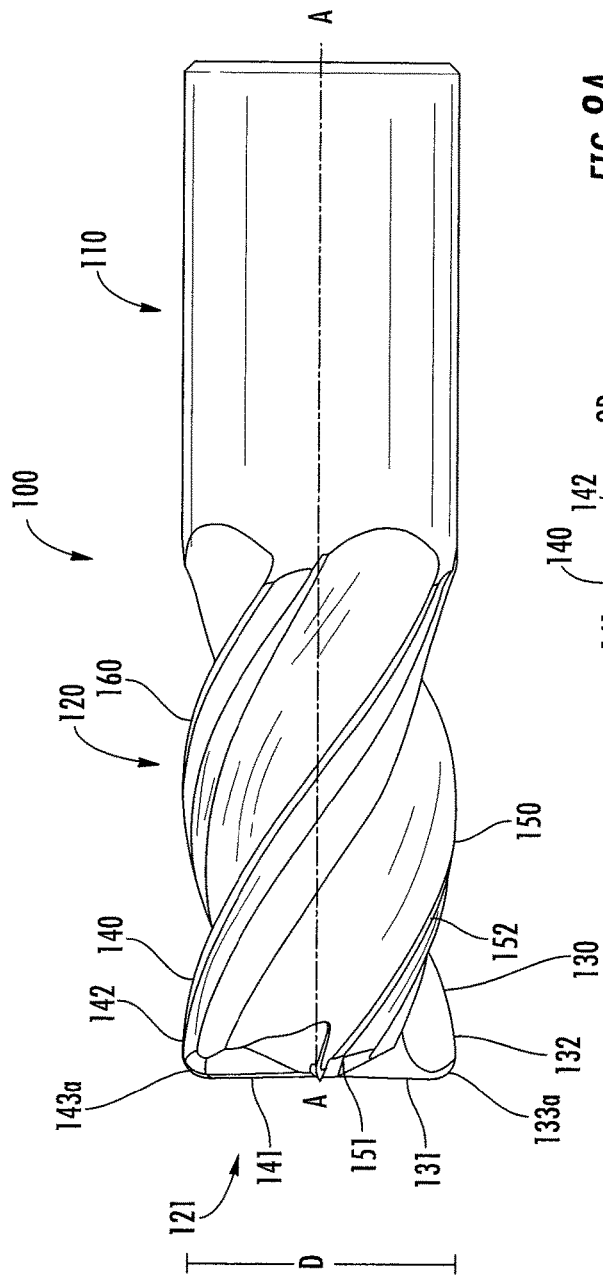
FIG. 8A illustrates a side view of a rotary cutting tool according to one embodiment described herein.
Figure 8B:
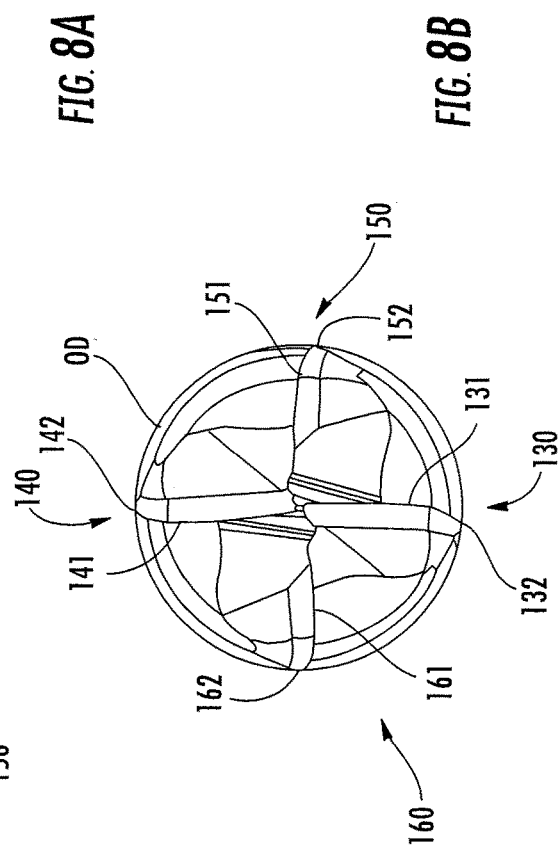
FIG. 8B illustrates an end view of the rotary cutting tool of FIG. 8A.

With specific reference to FIGS. 1A through 12C, an elongated rotary cutting tool (100) is described herein. The elongated rotary cutting tool (100), such as an end mill, defines a central longitudinal axis (A-A) and comprises a shank portion (110) and a cutting portion (120) adjoining the shank portion (110). The cutting portion (120) has a cutting end (121) and at least a first blade (130). The first blade (130) has an end cutting edge (131) and a peripheral cutting edge (132). The end cutting edge (131) of the first blade (130) extends from an outer diameter (OD) of the cutting portion (120) towards the central longitudinal axis (A-A). The end cutting edge (131) of the first blade (130) defines a first dish profile and a first axial profile. A "dish profile," as described herein, refers to the profile or shape of an end cutting portion of a blade when viewed a side of the cutting tool, as in FIG. 1A. An "axial profile," as described herein, refers to the profile of the end cutting portion of a blade when viewed from an end, as in FIG. 1B. In some embodiments, the first blade (130) extends from the outer diameter (OD) to the central longitudinal axis (A-A) as shown in FIG. 5B. In certain other embodiments, the first blade (130) extends less than the full distance from the outer diameter (OD) to the central longitudinal axis (A-A), as in FIGS. 1A and 1B.

Embodiments of rotary cutting tools described herein are not limited to a single blade. One of skill in the art would readily understand that rotary cutting tools consistent with the present invention may include any number of blades. For example, in some embodiments, a rotary cutting tool (100) further comprises a second blade (140). The second blade (140) is disposed opposite the first blade (130) on the cutting portion (120) and has an end cutting edge (141) and a peripheral cutting edge (142). The end cutting edge (141) of the second blade (140) extends from the outer diameter (OD) of the cutting portion (120) towards the central longitudinal axis (A-A). The end cutting edge (141) of the second blade (140) defines a second dish profile and a second axial profile. In some embodiments, the second dish profile is curved.

In embodiments having two or more blades, various configurations and architectures of the first blade (130) and the second blade (140) are possible within the scope of the present invention. For example, in some embodiments, the first dish profile and the second dish profile are reflectively symmetric. Such an arrangement is shown, among other drawings, in FIGS. 2A/B. Further, in some embodiments, the first dish profile and the second dish profile together form a convex curve. Such an arrangement is shown, for example, in FIG. 7A. Alternatively, in some embodiments, the first dish profile and the second dish profile together form a concave curve. Such an embodiment is illustrated in, for example, FIGS. 8A, 9A, and 10A. It is to be understood that such arrangements in which opposite dish profiles, when together, may form a concave or convex dish overall, that a dish profile of individual teeth or cutting edges is to be convex. In any of such arrangements, a radially innermost portion of dish profiles described herein is axially rearward of at least one other point along the same dish profile. Such an arrangement permits the necessary clearance at the radially innermost portion (or, in some cases, the center of the end face of the tool) such that cutting tools described herein are capable of ramping operations.

Figure 1B:
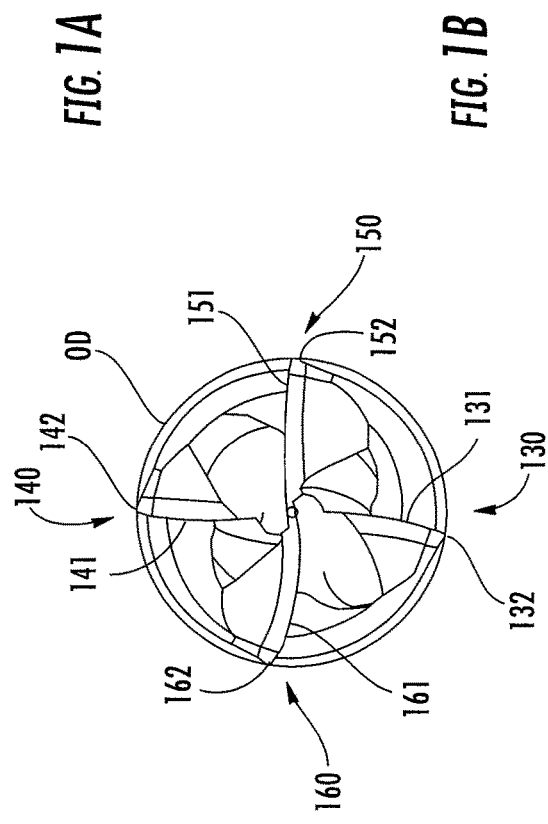
FIG. 1B illustrates an end view of the rotary cutting tool of FIG. 1A.
Figure 2A:
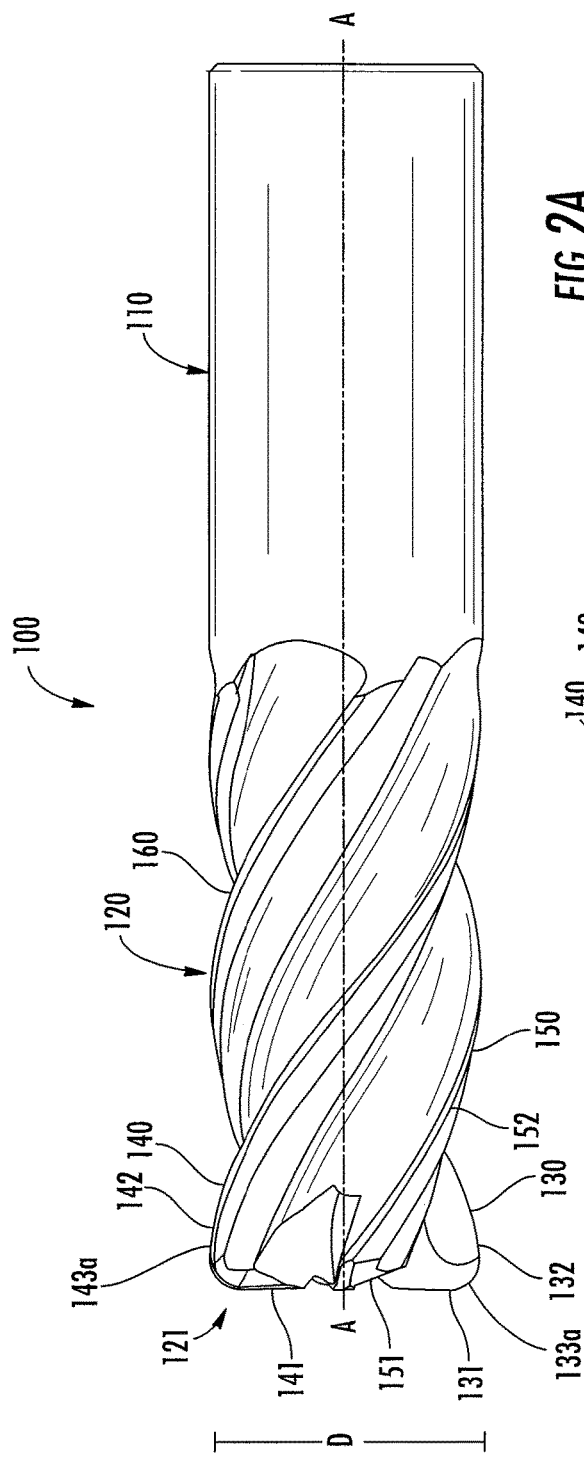
FIG. 2A illustrates a side view of a rotary cutting tool according to one embodiment described herein.
Figure 2B:
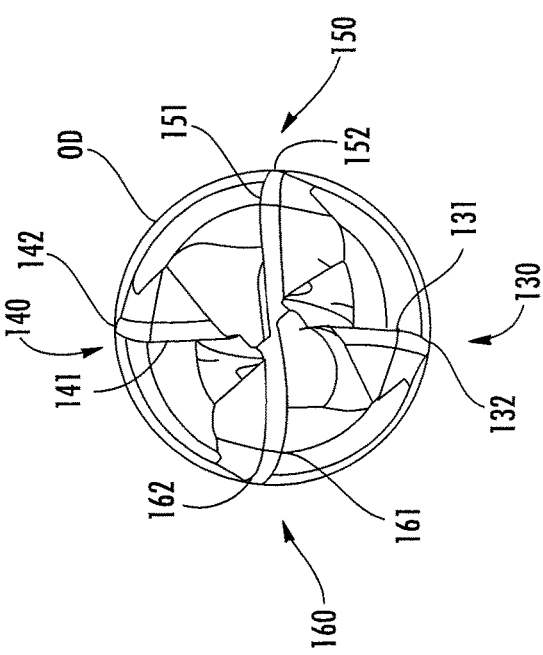
FIG. 2B illustrates an end view of the rotary cutting tool of FIG. 2A.

In some embodiments, the first axial profile and the second profile are rotationally asymmetric. One such embodiment is illustrated in FIG. 1B. Alternatively, in some embodiments, the first axial profile and the second axial profile are rotationally symmetric. It is to be understood that in such embodiments, the first dish profile and the second dish profile are still reflectively symmetric.

As discussed above, rotary cutting tools described herein may have any number of blades. For example, in some embodiments, the rotary cutting tool (100) further comprises a third blade (150) between the first blade (130) and the second blade (140). The third blade (150) has an end cutting edge (151) and a peripheral cutting edge (152). The end cutting edge (151) of the third blade (150) extends from the outer diameter of the cutting portion (120) towards the central longitudinal axis (A-A). The end cutting edge (151) of the third blade (150) defines a third dish profile and a third axial profile, wherein the third dish profile is curved. In some such embodiments, the third axial profile is rotationally asymmetric with at least one of the first axial profile and the second axial profile. Alternatively, in some embodiments, the third axial profile is rotationally symmetric to at least one of the first axial profile and the second axial profile. One such embodiment is illustrated in FIG. 1B.

Further, in some embodiments, the rotary cutting tool (100) further comprises a fourth blade (160), the fourth blade (16) being disposed opposite the third blade (150) and having an end cutting edge (161) and a peripheral cutting edge (162). The end cutting edge (161) of the fourth blade (160) extends from the outer diameter (OD) of the cutting portion (120) towards the central longitudinal axis (A-A), the end cutting edge (161) of the fourth blade (160) defining a fourth dish profile and a fourth axial profile. The fourth dish profile is curved. In some such embodiments, the third dish profile and the fourth dish profile are reflectively symmetric. Further, in some embodiments, the third dish profile and the fourth dish profile together form a concave curve. Alternatively, in some embodiments, the third dish profile and the fourth dish profile together form a concave curve. Additionally, in some embodiments, the fourth axial profile is rotationally symmetric to at least one of the first axial profile, the second axial profile, and the third axial profile. Further, in some embodiments, the fourth axial profile is rotationally asymmetric to at least one of the first axial profile, the second axial profile, and the third axial profile. Such embodiments may be in addition to or an alternative to embodiments in which the fourth dish profile is rotationally symmetric to one of the first axial profile, the second axial profile, and the third axial profile. Moreover, in some embodiments, each of the first axial profile, the second axial profile, the third axial profile, and the fourth axial profile are rotationally asymmetric to one another.

Various corner configurations may be used consistent with embodiments described herein. For example, in some embodiments, the first blade (130) defines a rounded corner cutting edge (133*a*) connecting the end cutting edge (131) and the peripheral cutting edge (132) of the first blade (130), the rounded corner cutting edge (133*a*) defining a rounded corner radius. The cutting portion (120) defines a diameter, D. Various embodiments of such an arrangement are shown in the Figures such as, by way of non-limiting examples, FIGS. 1A, 2A, and 7A. In some such embodiments, the rounded corner radius of the first blade is greater than or equal to 0.008D and less than 0.5D, such as less than or equal to 0.495D. It is to be understood that the foregoing range is inclusive of each of the endpoints, but also includes any subranges contained within the foregoing range. Table I below provides various minimum and maximum values for a range which may contain the rounded corner radius of the first blade. Individual minimum values need not be associated with the maximum radius on the corresponding line of the table.

TABLE I

| Min. Radius | Max. Radius |
|---|---|
| 0.008D | 0.495D |
| 0.01D | 0.45D |
| 0.025D | 0.4D |
| 0.05D | 0.35D |
| 0.1D | 0.3D |
| 0.25D | 0.2D |
| 0.3D | 0.1D |

In certain embodiments, the first blade (130) defines a chamfered corner cutting edge (133b) connecting the end cutting edge (131) and the peripheral cutting edge (132). Such an embodiment is illustrated, for example, in FIG. 3A. Additionally, in some embodiments, the end cutting edge (131) and the peripheral cutting edge (132) of the first blade (130) together join to form a sharp corner cutting edge (133c) such as in FIG. 4A. It is to be understood that any individual corner configuration may be uniformly used across all blades within a given cutting tool.

In addition to the above-described embodiments, it is to be understood that additional configurations may also be possible. For example, in some embodiments, any one or more of the axial profiles (first, second, third, fourth, and subsequent) may be curved or straight. Such embodiments can include embodiments in which all of the axial profiles in a cutting tool are curved, all axial profiles are straight, and/or some axial profiles are curved, and others are straight. In certain embodiments, all axial profiles are the same or substantially the same. In some other embodiments, all axial profiles differ from one another, generating a "variable helix" effect among the blades. Moreover, in some embodiments, some axial profiles may be the same or substantially the same as at least one other axial profile, but may differ from one at least one other axial profile.

It is to be understood that although individual blades are described separately herein, that any individual properties of particular blades may be applicable to one or more other blades on the rotary cutting tool. Alternatively, in some embodiments, no two blades in a rotary cutting tool may have the same dish and/or axial profiles. Additionally, it is to be understood that although embodiments are described herein have four or fewer blades, that any number of blades may be used consistent with the objectives of the present invention.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An elongated rotary cutting tool defining a central longitudinal axis and comprising:
   a shank portion; and
   a cutting portion adjoining the shank portion and having a cutting end, the cutting portion having at least a first blade, the first blade having an end cutting edge and a peripheral cutting edge,
   wherein the end cutting edge of the first blade extends from an outer diameter of the cutting portion towards the central longitudinal axis, the end cutting edge of the first blade defining a first dish profile defined by a shape of the first blade when viewed from a side of the rotary cutting tool and a first axial profile defined by a shape of the first blade when viewed from an end of the rotary cutting tool;
   wherein the first dish profile is curved; and
   wherein a radially innermost portion of the first dish profile is axially rearward of all other points on the first dish profile.

2. The rotary cutting tool of claim 1, wherein the first axial profile is curved.

3. The rotary cutting tool of claim 1 further comprising a second blade, the second blade being disposed opposite the first blade on the cutting portion and having an end cutting edge and a peripheral cutting edge,
   wherein the end cutting edge of the second blade extends from the outer diameter of the cutting portion towards the central longitudinal axis, the end cutting edge of the second blade defining a second dish profile defined by a shape of the second blade when viewed from the side of the rotary cutting tool and a second axial profile defined by a shape of the second blade when viewed from the end of the rotary cutting tool; and
   wherein the second dish profile is curved.

4. The rotary cutting tool of claim 3, wherein the first dish profile and the second dish profile are reflectively symmetric across a plane containing the central longitudinal axis.

5. The rotary cutting tool of claim 3, wherein the first dish profile and the second dish profile together form a concave curve.

6. The rotary cutting tool of claim 3, wherein the first axial profile and the second axial profile are rotationally asymmetric using the central longitudinal axis as a center of rotation.

7. The rotary cutting tool of claim 3, wherein the first axial profile and the second axial profile are rotationally symmetric using the central longitudinal axis as a center of rotation.

8. The rotary cutting tool of claim 3, wherein the second axial profile is curved.

9. The rotary cutting tool of claim 3 further comprising a third blade between the first blade and the second blade and having an end cutting edge and a peripheral cutting edge,
   wherein the end cutting edge of the third blade extends from the outer diameter of the cutting portion towards the central longitudinal axis, the end cutting edge of the third blade defining a third dish profile defined by a shape of the third blade when viewed from the side of the rotary cutting tool and a third axial profile defined by a shape of the third blade when viewed from the end of the rotary cutting tool; and
   wherein the third dish profile is curved.

10. The rotary cutting tool of claim 9, wherein the third axial profile is rotationally asymmetric with at least one of the first axial profile and the second axial profile using the central longitudinal axis as a center of rotation.

11. The rotary cutting tool of claim 9, wherein the third axial profile is rotationally symmetric to at least one of the first axial profile and the second axial profile using the central longitudinal axis as a center of rotation.

12. The rotary cutting tool of claim 9, wherein the third axial profile is curved.

13. The rotary cutting tool of claim 9 further comprising a fourth blade, the fourth blade being disposed opposite the third blade and having an end cutting edge and a peripheral cutting edge, wherein the end cutting edge of the fourth blade extends from the outer diameter of the cutting portion towards the central longitudinal axis, the end cutting edge of the fourth blade defining a fourth dish profile defined by a shape of the fourth blade when viewed from the side of the rotary cutting tool and a fourth axial profile defined by a shape of the fourth blade when viewed from the end of the rotary cutting tool; and wherein the fourth dish profile is curved.

14. The rotary cutting tool of claim 13, wherein the third dish profile and the fourth dish profile are reflectively symmetric across a plane containing the central longitudinal axis.

15. The rotary cutting tool of claim 13, wherein the third dish profile and the fourth dish profile together form a concave curve.

16. The rotary cutting tool of claim 13, wherein the fourth dish profile is rotationally symmetric to at least one of the first axial profile, the second axial profile, and the third axial profile using the central longitudinal axis as a center of rotation.

17. The rotary cutting tool of claim 13, wherein the fourth dish profile is rotationally asymmetric to at least one of the first axial profile, the second axial profile, and the third axial profile using the central longitudinal axis as a center of rotation.

18. The rotary cutting tool of claim 13, wherein each of the first axial profile, the second axial profile, the third axial profile, and the fourth axial profile are rotationally asymmetric to one another using the central longitudinal axis as a center of rotation.

19. The rotary cutting tool of claim 13, wherein the fourth axial profile is curved.

20. The rotary cutting tool of claim 1, wherein: the first blade defines a rounded corner cutting edge connecting the end cutting edge and the peripheral cutting edge of the first blade, the rounded corner cutting edge defining a rounded corner radius; the cutting portion defines a diameter, D; and the rounded corner radius of the first blade is between 0.008D and 0.5D.

21. The rotary cutting tool of claim 1, wherein the first blade defines a chamfered corner cutting edge connecting the end cutting edge and the peripheral cutting edge.

22. The rotary cutting tool of claim 1, wherein the end cutting edge and the peripheral cutting edge of the first blade together join to form a sharp corner cutting edge.

\* \* \* \* \*